June 17, 1958 W. R. SMITH-VANIZ, JR 2,839,684

AUTOMATIC FREQUENCY CONTROL

Filed May 6, 1954

INVENTOR.
WILLIAM R. SMITH-VANIZ, JR.
BY
Curtis, Morris & Safford 2,839,684
Patented June 17, 1958

2,839,684

AUTOMATIC FREQUENCY CONTROL

William R. Smith-Vaniz, Jr., Stamford, Conn., assignor to C. G. S. Laboratories, Inc., Stamford, Conn., a corporation of Connecticut Application May 6, 1954, Serial No. 427,970
6 Claims. (Cl. 250—36)

This invention relates to automatic control and indicating apparatus. The invention is described as embodied in a compensating and stabilizing circuit for use with an oscillator.

Various methods have been developed for stabilizing the operating frequency of oscillators. In one system, the output signal from the oscillator is fed through a discriminator network which produces a direct current control signal whose polarity depends upon whether the frequency of the generated signal is higher or lower in frequency than the mid-frequency of the response range of the discriminator. This control voltage is produced, however, only over a relatively narrow range of frequencies. That is, the stabilizing circuit loses all control when the generated frequency is displaced by more than a small amount from its normal or center frequency.

For example, in a conventional discriminator circuit, the output voltage increases rapidly with increasing difference between the frequencies of the applied signals and the center frequency of the discriminator circuit. However, with greater than a certain deviation in either direction, the output voltage decreases rapidly to zero. Therefore, in a control system utilizing such a discriminator, when the frequency drifts off center so far that the discriminator output is reduced nearly to zero, the stabilization circuits lose all control.

The problem of attaining a wide range of correction for automatic frequency control systems has existed for some time. It has, however, taken on even greater significance with the increasing use of electronic equipment under extremes of adverse environmental conditions, particularly in the military services. Wide variations of frequency are experienced, for example, when equipment is exposed to severe cold, as in high-altitude aircraft, or to severe heat as in the tropical regions, or to mechanical shocks as in mobile equipment transported over rough terrain. Efforts to limit these effects have often been directed toward improved thermal insulating arrangements or shock-proofing, with a corresponding increase in cost and complexity of the equipment.

The present invention is directed toward increasing the range of correction by a substantial amount, and is embodied in apparatus constructed entirely of conventional circuit elements arranged in a novel manner whereby the frequency-sensing networks provide correction signals of correct polarity to the oscillator control element irrespective of the extent of frequency drift.

In a preferred embodiment of the invention, the signal whose frequency is to be controlled is applied to a frequency sensitive network having two operating portions that feed into a common output network. Each portion of the frequency sensitive network is arranged to produce the same signal attenuation at the desired operating frequency so that in the common output circuit the two signals can be opposed to produce zero output voltage. At frequencies lower than the selected control frequency only one of the portions of the frequency sensitive network continues to deliver a significant output voltage; only the other portion continues to deliver an appreciable output voltage at frequencies higher than the control frequency. These portions may comprise frequency selective circuits having a sharp cut-off at the control frequency but one of them passing all frequencies above the control frequency and the other passing all frequencies below the control frequency.

Other aspects, objects, and advantages of the invention will be in part pointed out in and in part apparent from the following description of apparatus embodying the invention, considered together with the accompanying drawings in which.

Figure 1:
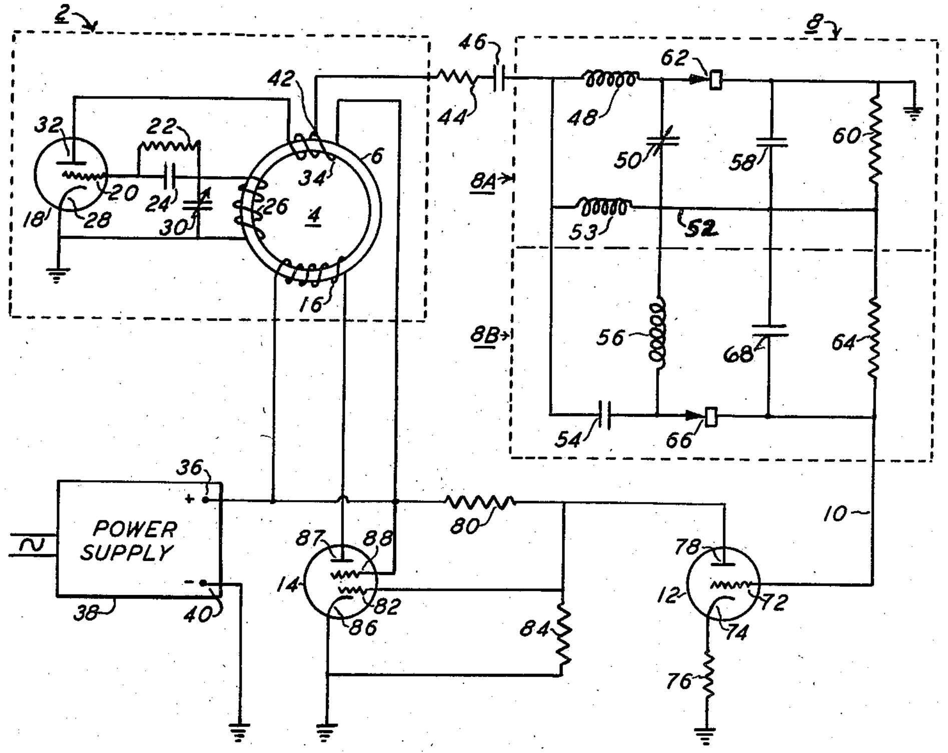
Figure 1 is a schematic circuit diagram of one embodiment of the invention.

In the arrangement shown in Figure 1, an oscillator 2 serves as the source of signals to be controlled and incorporates a controllable inductor 4 having a toroidal core 6 which serves as the frequency-regulating element of the oscillator circuit. A small part of the energy of the signal generated by the oscillator 2 is applied to a frequency sensitive network 8 which may be considered to be formed of two portions denoted respectively at 8A and 8B. The portion 8A is arranged to pass signals of all frequencies below the "control frequency," and the portion 8B is arranged to pass signals of all frequencies above the "control frequency."

The common output circuit of the frequency sensitive network 8 is connected by a lead 10 through a direct-current amplifier tube 12 and a current-control tube 14 to a control winding 16 on the toroidal core 6.

The oscillator 2 is conventional, except for the controllable inductor 4, and includes a vacuum tube 18 having a control grid 20 connected through a grid leak resistor 22 and a parallel-connected condenser 24 and a signal winding 26 on the toroidal core 6 to the cathode 28 of the tube 18. A condenser 30 is connected in parallel with the winding 26 to form a resonant circuit that directly controls the frequency generated by the oscillator.

The anode 32 of the tube 18 is connected through a feed-back winding 34 on the core 6 to a positive voltage output terminal 36 of a conventional power supply 38, the negative voltage output terminal 40 of which is connected to the common ground circuit.

The controllable inductor 4 may be of the general type described by Dewitz in application Serial No. 213,548, filed March 3, 1951. The core 6 is formed of magnetic ceramic material, such as that ordinarily referred to as ferrite. The effective inductance of windings having cores of this material decreases with increasing magnetic saturation of the core, so that by controlling the direct current through the control winding 16, the extent of magnetic saturation can be controlled which in turn controls the effective inductance of the signal winding 26. Any change in the inductance of the winding 26 changes the resonant frequency of the oscillator tank circuit. The frequency of the signal delivered by the oscillator 2 therefore depends upon the magnitude of the current in the control winding 16.

There are a number of important advantages in the use of magnetic ceramic core material, such as ferrite. Among these are: the ability to operate at high frequencies, for example even into the megacycle range; the high inherent inductance of windings wound on ferrite materials; and the fact that the Q of the core does not decrease rapidly with increasing magnetic saturation and may even increase when the magnetic saturation increases. Most important, however, for the present application is the ability to operate satisfactorily over wide ranges of inductance. That is, the resonant frequency of the circuit formed by the winding 26 and the capacitor 30 can be varied over a wide range. In practice, the frequency should be variable over a minimum of one octave while a 10:1 operating range can be attained readily. The importance of such wide range control characteristics when combined with the extended operating range of the frequency sensitive network 8 will be apparent.

A portion of the oscillator output energy is coupled from a tap 42 on the winding 34 through an isolation resistor 44 and a blocking capacitor 46 to the frequency sensitive network 8. In portion 8A, the oscillator signal is applied through a series inductance 48 and a condenser 50 to a lead 52. A radio frequency choke 53 is connected between the lead 52 and the input terminal of the inductor 48.

This portion of the oscillator signal is applied also to a capacitor 54 and an inductance 56 connected in series between the input terminal to the frequency sensitive network 8 and the lead 52 which is at ground potential so far as radio frequency current is concerned because of a condenser 58, of relatively large capacitance, which is connected between the lead 52 and the common ground circuit.

The inductor 48 and the capacitor 50 are chosen so as to be series resonant at a frequency slightly lower than the desired frequency of operation; the capacitor 54 and inductor 56 are selected to form a series resonant circuit at a frequency slightly higher than this desired operating frequency.

The radio frequency voltage developed across the capacitor 50 is rectified and used to produce a direct control voltage across a load resistor 60. To this end, a half-wave rectifier 62 is connected between one plate of the capacitor 50 and one end of the resistor 60; the other end of this resistor is connected directly to the other electrode of the capacitor 50. The filter condenser 58 smooths the pulsating direct voltage applied to the resistor 60.

The radio frequency voltage developed across the inductor 56 is used to produce a direct control voltage across a load resistor 64. To this end, a half-wave rectifier 66 is connected between one terminal of the inductor 56 and one end of the load resistor 64; the other end of this resistor is connected directly to the other terminal of the inductor 56. A filter condenser 68 is connected in parallel with the resistor 64.

At the "control frequency," that is the frequency midway between the resonance frequency of the inductor 48 and the capacitor 50 and the resonance frequency of the capacitor 54 and the inductor 56, the magnitudes of the voltages developed across the capacitor 50 and the inductor 56 are equal so as to produce equal direct voltages across the output load resistors 60 and 64. These two load resistors are connected in series, with opposing voltage relationships, so that at the "control frequency" no net voltage appears between the outer ends of the load resistors. One end of the resistor 60 is connected to the common ground circuit and the opposite end of the resistor 64 is connected to the control lead 10. The voltage between ground and the control lead 10 therefore is the difference between the two direct voltages appearing across the resistors 60 and 64.

At frequencies above the "control frequency," the voltage appearing across the capacitor 50 decreases, thus decreasing the direct voltage produced across the load resistor 60. The voltage across the inductor 56, however, increases at frequencies above "control frequency," thus increasing the voltage across the load resistor 64. With the illustrated arrangement, a positive control voltage is produced on the control lead 10 when the frequency of the applied signal is higher than the "control frequency."

At frequencies below the "control frequency" the voltage appearing across the capacitor 50 increases, increasing the direct voltage across the resistor 60, and the voltage across the inductor 56 decreases, reducing the voltage across the resistor 64. Thus, a negative control voltage is produced on the control lead 10 when the frequency of the applied signal is lower than the "control frequency."

Thus, whenever the frequency of the signal from the oscillator is above or below the control frequency, an unbalance voltage will be applied through the lead 10 to the control grid 72 of the vacuum tube 12, the cathode 74 of which is connected to the common ground circuit through a bias resistor 76. The anode 78 of this tube is connected through a load resistor 80 to the positive terminal 36 of the power supply 38.

In order to obtain further current amplification the anode 78 is connected to the control grid 82 of the vacuum tube 14, and through a resistor 84 to the cathode 86 which is connected also to the common ground circuit. The anode 87 of this tube is connected through the control winding 16 of the controllable inductor 4 to the positive terminal 36 of the power supply. Its screen grid 88 is connected directly to the positive terminal 36.

In operation, any deviation of the frequency of the generated signal from the control frequency produces a control voltage that causes a change in current through the control winding 16 of such magnitude and direction as to modify the effective inductance of the winding 26 to bring the oscillator 2 back to the proper operating frequency. An increase in operating frequency produces a positive control voltage which increases the anode current in the tube 12 and decreases the current through the tube 14 and the control winding 16. This decrease in control current decreases the extent of saturation of the core 6 and increases the effective inductance of the winding 16 and decreases the operating frequency of the oscillator to return it to the "control frequency." A decrease in frequency below the "control frequency" produces a negative control voltage that increases the current through the winding 16 to increase the operating frequency of the oscillator 2.

In one particular apparatus, components having the following values were used. The capacitor 50 was formed of a fixed value capacitor of 900 micromicrofarads connected in parallel with a variable capacitor of 750 micromicrofarads, the capacitors being connected from the inductor 48 directly to the common ground circuit. The capacitor 54 had a value of 1100 micromicrofarads and the inductors 56 and 48 were about 5 mh. each. The capacitors 58 and 68 were each 0.05 microfarads and the load resistors 60 and 64 were 240,000 ohms each. Type 1N38 crystal rectifiers were used for the non-linear elements 62 and 66.

The center frequency of the circuit was about 65 kilocycles and the high frequency circuit was resonant at a frequency between one and two kilocycles higher than the resonant frequency of the lower frequency circuit. This particular discriminator was used to provide an error signal having correct polarity and of sufficient magnitude to operate a frequency-correcting circuit over a range of input frequencies between 40 and 80 kilocycles, but tests indicated that control was maintained between 10 and 500 kilocycles.

It will be apparent that the circuitry presented in connection with D.-C. amplifier tubes 14 and 72 is schematic in nature, the construction and characteristics of such amplifiers being well known.

Figure 2:
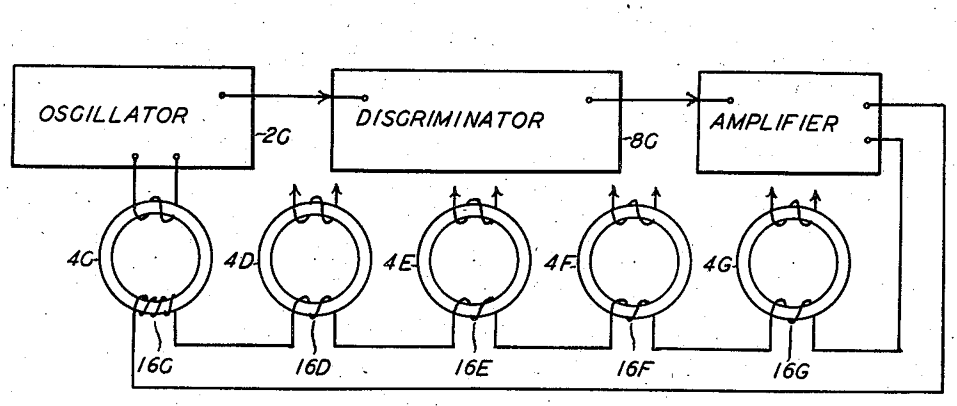
Figure 2 represents another apparatus utilizing the invention.

Controllable inductors with ferrite cores such as the inductor 4 are useful for many applications, but in general are sensitive to temperature and certain other operating conditions. The arrangement described above is well suited, in addition to the stabilization of signal sources, for the stabilization of a number of magnetizable cores all operating under similar ambient or other conditions. Figure 2 shows such a system.

In this example, the oscillator 2C is assumed to be particularly stable, suitable voltage stabilizing circuits and temperature stabilizing or compensating arrangements being provided. The core 4C, with its windings 16C and and 26C, however, forms an unstabilized frequency-controlling part of the oscillator and is positioned so as to be subjected to the same ambient conditions as other inductors 4D, 4E, 4F, and 4G, having cores of similar material. These other inductors, of which there may be any desired number, are assumed to be utilized in any desired circuit arrangements and that they are desired to be free from drift caused by changes in ambient temperature.

Because the frequency-sensitive networks 8C (which may be identical with the networks 8 of Figure 1) can be made stable so as to be unaffected by variations in temperature, the frequncy of the oscillator will remain constant irrespective of temperature. The control current through the control winding 16C of this inductor 4C, however, will vary with changes in ambient temperature in such manner that the effective inductance of the winding 26C will remain constant. It will be noted that the control windings 16D, 16E, 16F, and 16G are connected in series with the winding 16C so that the same corrective control current is impressed on each of the inductors.

It will be apparent that other control windings may be incorporated in the inductors 4D to 4G, the windings 16D to 16G serving only to stabilize the units against changes in ambient temperature.

I claim:

1. Automatic frequency control apparatus comprising electric oscillation producing means having a frequency-selective network including an electrically-controllable impedance element, a frequency-sensitive network comprising a high-pass series-resonant filter circuit including a first inductor in series with a first capacitor and resonant to a frequency above the desired controlled frequency and a low-pass series-resonant filter circuit including a second capacitor in series with a second inductor and resonant to a frequency below the desired controlled frequency, means coupling said oscillator to said frequency-sensitive network, first and second detection means connected to said high-pass and low-pass filter circuits, respectively a first resistor and a first condenser connected in parallel across said low pass filter circuit, a second resistor and a second condenser connected in parallel across said high pass filter circuit, said first and second resistors being connected in series so as to combine the signals from said filter circuits in opposition, and feedback means coupling the output of said series resistors and to said electrically-controllable empedance element.

2. Automatic frequency control apparatus for producing a signal of predetermined frequency, comprising an oscillator, an electrically-controllable frequency-determining network forming part of said oscillator and having a control winding for controlling the frequency of said oscillator, a series-resonant high-pass and series-resonant low-pass filter circuit each having cut-off frequencies near said predetermined frequency, means coupling said oscillator to each of said filter circuits, a resistor with a condenser in shunt therewith being connected across each of said filter circuits, said resistors being connected in series for combining the output signals from said filter circuits in opposition, and means coupling said series resistors to said control winding.

3. Automatic frequency-control apparatus comprising an oscillator having a frequency-determining network including an electrically-controllable inductor having a control winding, a frequency-sensitive network including a high-pass series-resonant filter, a low-pass series-resonant filter, common circuit means connecting one side of each of said filter circuits together, first and second detection means, said first detection means being connected to the other side of said high-pass filter, said second detection means being connected to the other side of said low-pass filter, a first resistor with a shunt condenser connected between said first detection means and said common circuit means, a second resistor with a shunt condenser connected between said second detection means and said common circuit means, said resistors being in series, and a common output circuit connected to both of said resistors, said output circuit being arranged to combine the output signals from said resistors in opposition, means coupling said oscillator to said frequency-sensive network, and circuit means coupling said common output circuit to said control winding of said electrically-controllable inductor.

4. Automatic frequency control apparatus comprising an oscillator having a frequency-determining network including an electrically-controllable inductor having a magnetizable ceramic core and a control winding thereon, a high-pass series-resonant filter and a low-pass series-resonant filter each connected to said oscillator and having cut-off frequencies in the same frequency range, first and second rectification means connected respectively to the outputs of said filters, means combining in opposition the voltages produced by said rectification means, means for amplifying said combined voltages, and means coupling the amplified voltages to said control windings.

5. Automatic frequency control apparatus comprising electric oscillation producing means having a frequency selective network including an electrically-controllable impedance element, a frequency-sensitive network having an input connection and common conduction means, a first inductor in circuit in series with a first condenser between said input connection and said common conduction means forming a low-pass filter, a second condenser in circuit in series with a second inductor between said input connection and said common conduction means forming a high-pass filter, a third inductor between said input connection and said common conduction means, a first rectifier coupled to the junction of said first inductor and first condenser, a second rectifier coupled to the junction of said second condenser and second inductor, a first resistor with a shunt condenser in circuit between said first rectifier and said common conduction means, and a second resistor with another shunt condenser in circuit between said second rectifier and said common conduction means, means coupling said oscillator to said frequency-sensitive network, and feedback means coupling said first and second resistors to said electrically-controllable impedance means.

6. A discriminator circuit including an input connection and common conduction means, a first inductor in circuit in series with a first condenser between said input connection and said common conduction means forming a low-pass filter, a second condenser in circuit in series with a second inductor between said input connection and said common conduction means forming a high-pass filter, a third inductor between said input connection and said common conduction means, a first rectifier coupled to the junction of said first inductor and first condenser, a second rectifier coupled to the junction of the second condenser and second inductor, a first resistor with a shunt condenser in circuit between said first rectifier and said common conduction means, and a second resistor with another shunt condenser in circuit between said second rectifier and said common conductor means.

References Cited in the file of this patent

UNITED STATES PATENTS

| | | |
|---|---|---|
| 1,712,051 | Round | May 7, 1929 |
| 1,788,533 | Marrison | Jan. 13, 1931 |
| 1,987,730 | Cravath | Jan. 15, 1935 |
| 2,114,036 | Smith | Apr. 12, 1938 |
| 2,138,341 | Crosby | Nov. 29, 1938 |
| 2,302,893 | Roberts | Nov. 24, 1942 |
| 2,708,219 | Carver | May 10, 1955 |